J. V. CARDEN.
AUTOMOBILE VEHICLE.
APPLICATION FILED APR. 4, 1921.
1,390,672.
Patented Sept. 13, 1921.
3 SHEETS—SHEET 1.
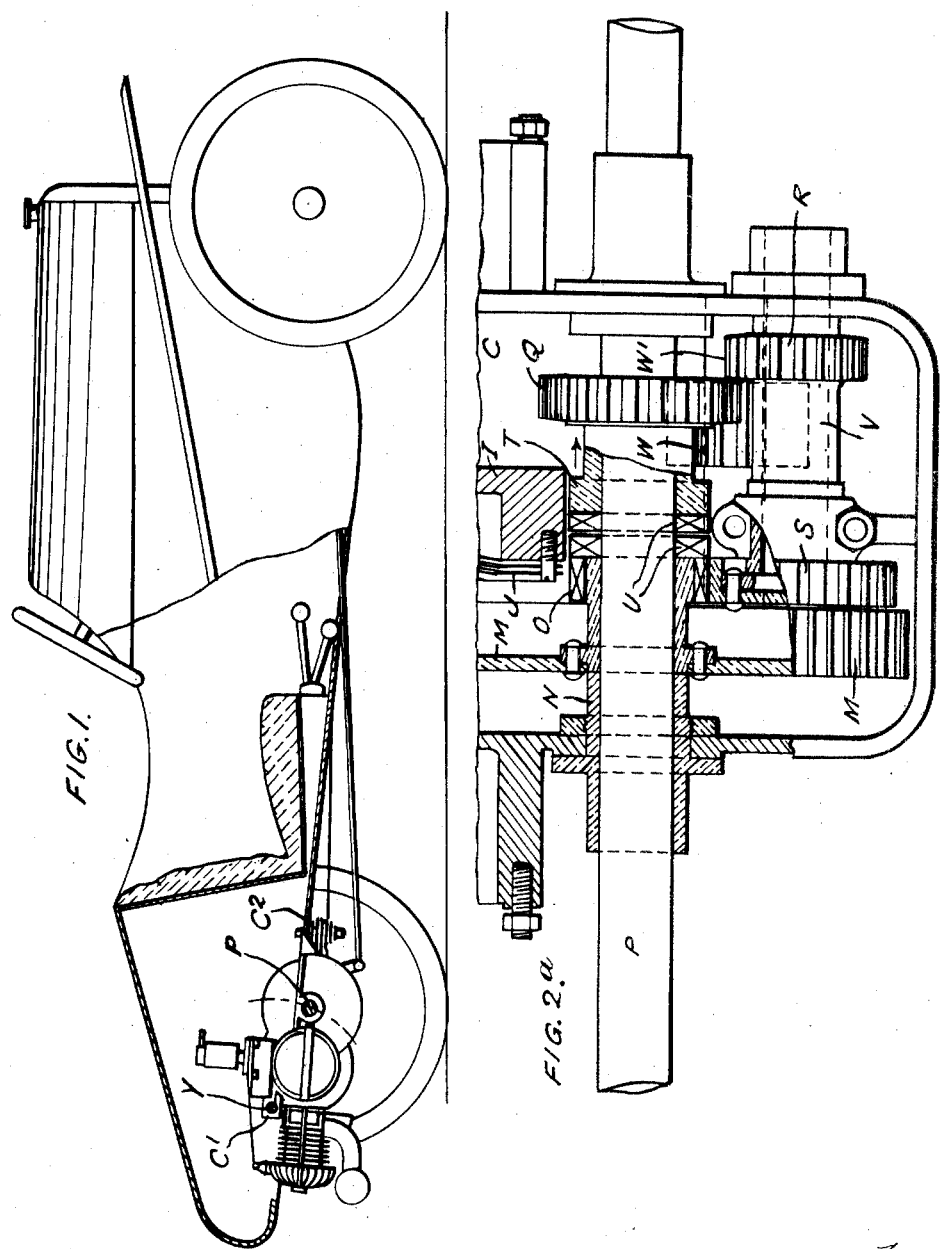
Inventor
John V. Carden
By
Attorney

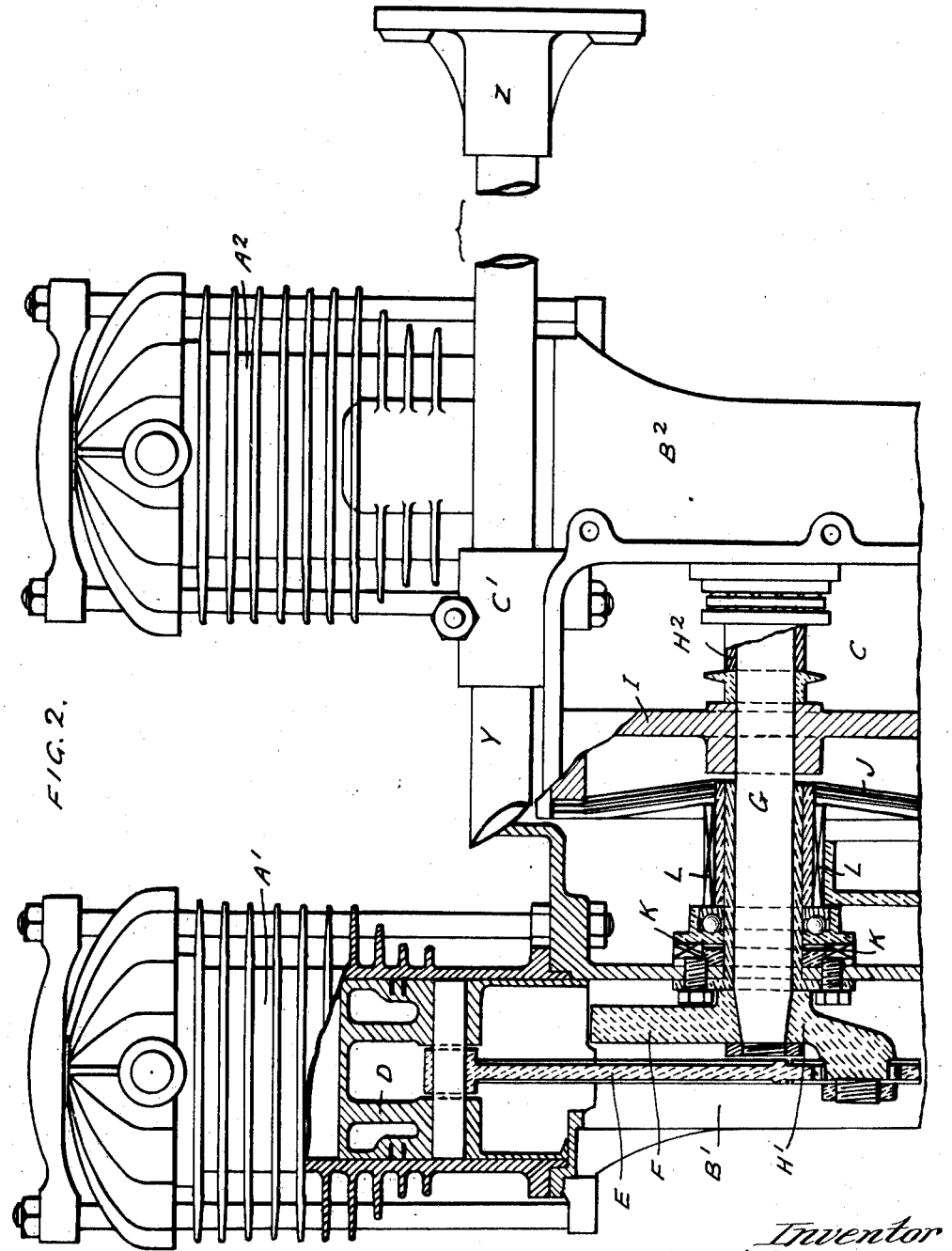

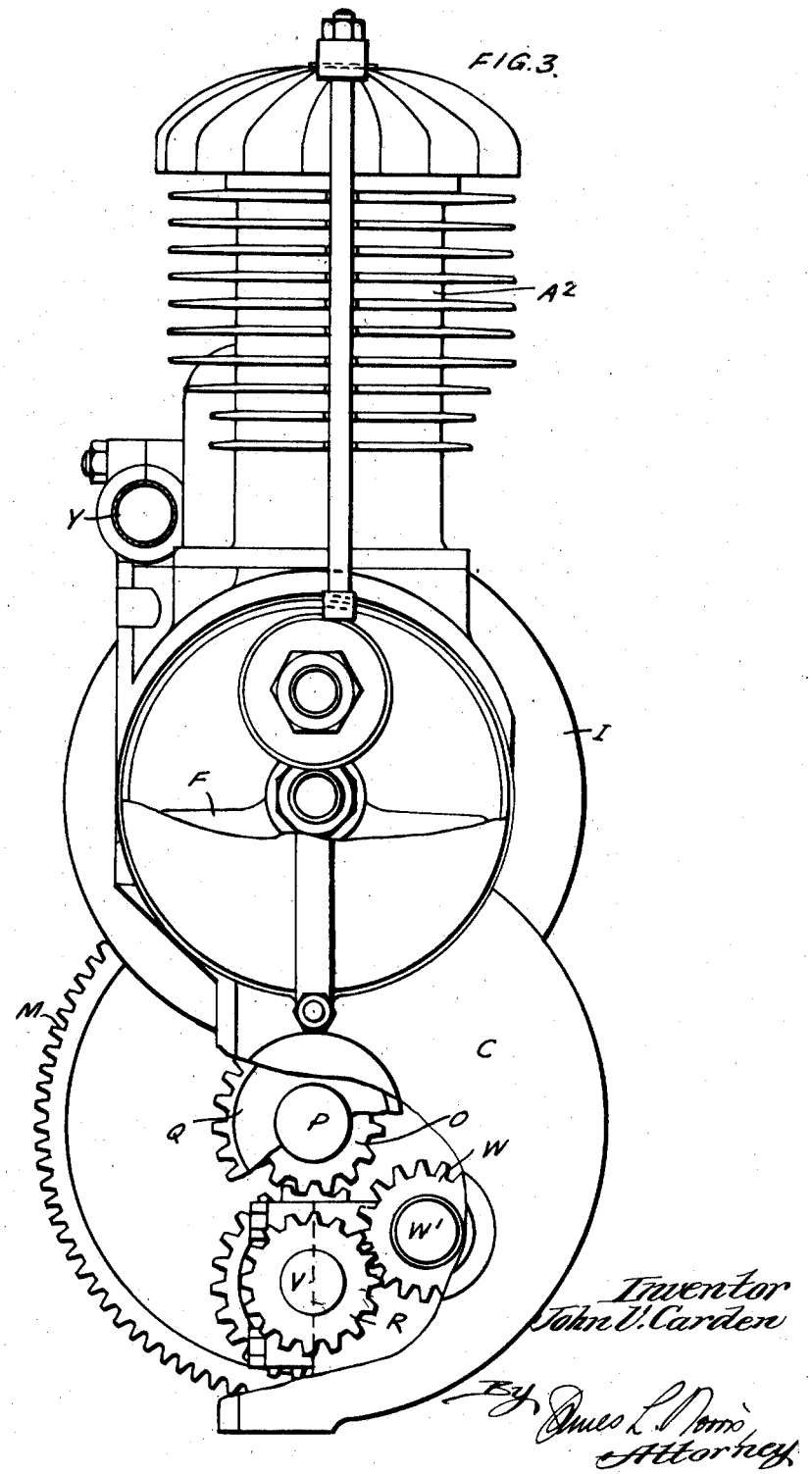

UNITED STATES PATENT OFFICE.

JOHN VALENTINE CARDEN, OF ASCOT, ENGLAND.

AUTOMOBILE VEHICLE.

1,390,672.  Specification of Letters Patent.  Patented Sept. 13, 1921.

Application filed April 4, 1921. Serial No. 458,470.

*To all whom it may concern:*

Be it known that I, JOHN VALENTINE CARDEN, a subject of the King of Great Britain, residing in Ascot, England, have invented certain new and useful Improvements in Automobile Vehicles, (for which I have filed an application in Great Britain dated January 23, 1920, Serial No. 2218,) of which the following is a specification.

This invention relates to automobile vehicles in which the engine, gear box and driving axle are rigidly connected to constitute a unitary structure which is pivoted transversely on the vehicle frame about an axis in the vertical transverse plane of the center of mass of the pivoted structure or approximating as nearly as possible thereto.

The primary object of the invention is to promote the smoothness of running of such vehicles by reducing to a minimum stresses in the vehicle frame due to road shocks communicated through the driving axle. This object is attained by a novel arrangement of the elements of the pivoted unitary structure above referred to, whereby the length of the structure is reduced to a minimum and the pivot axis brought outside the driving axle with respect to the car body, both of which features can be shown to contribute to the aforesaid object.

In this arrangement the engine cylinders (or cylinder) are so placed that the crank shaft is parallel with the driving axle so that *e. g.* in a multi-cylinder engine the cylinders are side by side in a transverse row, and the power is transmitted from the crank shaft to the driving axle through a parallel spur wheel drive. Moreover, the pivot axis and substantially the whole of the pivoted structure are brought outside the driving axle with respect to the car body by making the cylinders the outermost element of the structure.

A subsidiary feature of the invention, which may be introduced if desired, is the provision of such a connection between the pivoted unitary structure and its pivot that the said structure is capable of swinging about a longitudinal axis as well as about a transverse axis, both swinging movements being restrained and limited by some form of springing.

The invention will be hereinafter described as applied to a vehicle driven by a two cylinder internal combustion engine of the two stroke cycle type, but it will be understood that it is equally applicable to engines having more than two cylinders and other than the two-stroke type.

In the accompanying drawings Figure 1 is a general view in elevation, with parts broken away, of an automobile vehicle driven from the back axle embodying the invention; Figs. 2 and $2^a$ show a sectional plan on an enlarged scale through the center of the engine cylinders and driving axle; and Fig. 3 is an end elevation of Fig. 2 with parts broken away.

The unitary structure comprises the rearwardly projecting air-cooled engine cylinders $A'$, $A^2$ which are horizontally arranged side by side in a transverse row and bolted to crank cases $B'$, $B^2$ integral with the main gear box casting C. These, together with the parts carried by them, are secured by means of clamps $C'$ to a transverse shaft or tube Y the ends of which are journaled in trunnions Z bolted to the body sides. Journaled in bearings supported by the integral gear box casting C as shown in Fig. $2^a$, is the driving axle P which is thus supported in rigid relation to the tube Y. Consequently the driving axle P, on the ends of which the rear wheels of the vehicle are mounted, can move in an arc about the axis of the tube Y, and this movement is damped and limited by means of a spring or springs interposed between the car body and the gear case as indicated at $C^2$ (Fig. 1). The axis of the tube Y is in rear of the back axle P and as nearly as possible in the transverse vertical plane through the center of mass of the structure which it supports. In the position in which it is shown in Fig. 2 practically the whole mass of the cylinders, radiator and pistons overhangs the axis and consequently a considerable proportion of the total supported mass is balanced.

Instead of clamping the gear box casting rigidly to the tube Y by the two clamps $C'$ it may be pivotally connected with the tube at a central point so as to permit the supported structure to swing about a central fore and aft axis, such movement being also damped and limited by means of a spring or springs.

The pistons D are connected by their respective connecting rods E and cranks F with a common crankshaft journaled in bearings $H'$, $H^2$ supported by the crank casings $B'$, $B^2$. These bearings, preferably of phosphor bronze, are made extra long to minimize leakage from the crank casings and maintain the compression produced within the casings on the outward strokes of the pistons.

The power is transmitted from a flywheel I keyed on the crankshaft through a plate clutch J, the operating gear of which is shown in section at K (Fig. 2), to a centrally mounted pinion L which meshes with a large reduction spur wheel M on the driving axle P. This spur and the sleeve N and pinion O are loose on the shaft and rotate idly thereon when the gear is at neutral with the engine running.

Top gear is got by sliding the sleeve T which, together with the pinion Q integral with the sleeve is splined on the axle P, toward the left (looking at Fig. 2) so as to engage each other, thus locking the reduction gear wheel M on the driving axle, the power being transmitted to the road wheels through a single pair of gear wheels.

Low gear, which would be used as a rule for starting purposes only, is got by sliding the sleeve T to the right, as indicated by the arrow in Fig. 2, so as to bring the gear wheel Q into mesh with a pinion R which is fast on a lay shaft V journaled in bearings carried by the gear box casting. A spur wheel S, also fast on the shaft V, is permanently in mesh with the pinion O, so that the drive on low gear is through gear wheels M, O, S, R, Q.

Reverse gear is engaged by bringing a double pinion into mesh with the two gears Q, R when the former is in the position shown n Fig. 2ª, i. e. declutched from the pinion O. The double width pinion W is freely mounted on a stub shaft W' so supported in the casing C that the gear wheel W may be swung into engagement with the gears Q, R. Alternatively, the gear wheel W may be arranged so as to slide into mesh with its coöperating gears. The reverse drive would thus be transmitted through gear wheels M, O, S, R, W, Q.

Having thus described the nature of the said invention and the best means I know of carrying the same into practical effect, I claim:—

1. In automobile vehicles the combination of engine, gear box and driving axle in a unitary structure pivotally mounted about a transverse axis upon the vehicle frame which is located outboard the driving axle with respect to the wheel base.

2. In automobile vehicles, the combination of engine, gear box and driving axle in a unitary structure pivotally mounted about a transverse axis on the vehicle frame with the engine cylinders as the outermost element of the pivoted structure and the pivot axis located outside the driving axle with respect to the wheel base.

3. In automobile vehicles, the combination of engine, gear box and driving axle in a unitary structure pivotally mounted about a transverse axis on the vehicle frame with the engine crank shaft parallel with the driving axle and the pivot axis located outside the driving axle with respect to the wheel base.

4. An automobile vehicle wherein the engine, gear box and driving axle constitute a unitary structure pivotally mounted about a transverse axis upon the vehicle frame and the engine cylinders form the outermost element of the pivoted structure and are arranged horizontally side by side in a transverse row with the cylinder heads outward, the crank shaft being connected by parallel gears with the driving axle which constitutes the innermost element of the pivoted structure, said driven axle and cylinders being on opposite sides of the pivotal axis of said structure.

In testimony whereof I have signed my name to this specification.

JOHN VALENTINE CARDEN.